2 Sheets—Sheet 2.

F. P. FULLER.
Harrow.

No. 226,448.          Patented April 13, 1880.

Attest:
T. Walter Fowler
W. H. Morsell.

Inventor:
Franklin P. Fuller
per Attys
A. H. Evans & Co.

UNITED STATES PATENT OFFICE.

FRANKLIN P. FULLER, OF MOUNT VERNON, OHIO, ASSIGNOR OF ONE-HALF OF HIS RIGHT TO STEWART D. ROBERTS.

HARROW.

SPECIFICATION forming part of Letters Patent No. 226,448, dated April 13, 1880.

Application filed February 6, 1880.

*To all whom it may concern:*

Be it known that I, FRANKLIN P. FULLER, of Mount Vernon, Ohio, have invented a new and useful Improvement in Harrows, of which the following is a clear, full, and exact description, reference being had to the accompanying drawings, making a part of this specification, in which—

Figure 1:
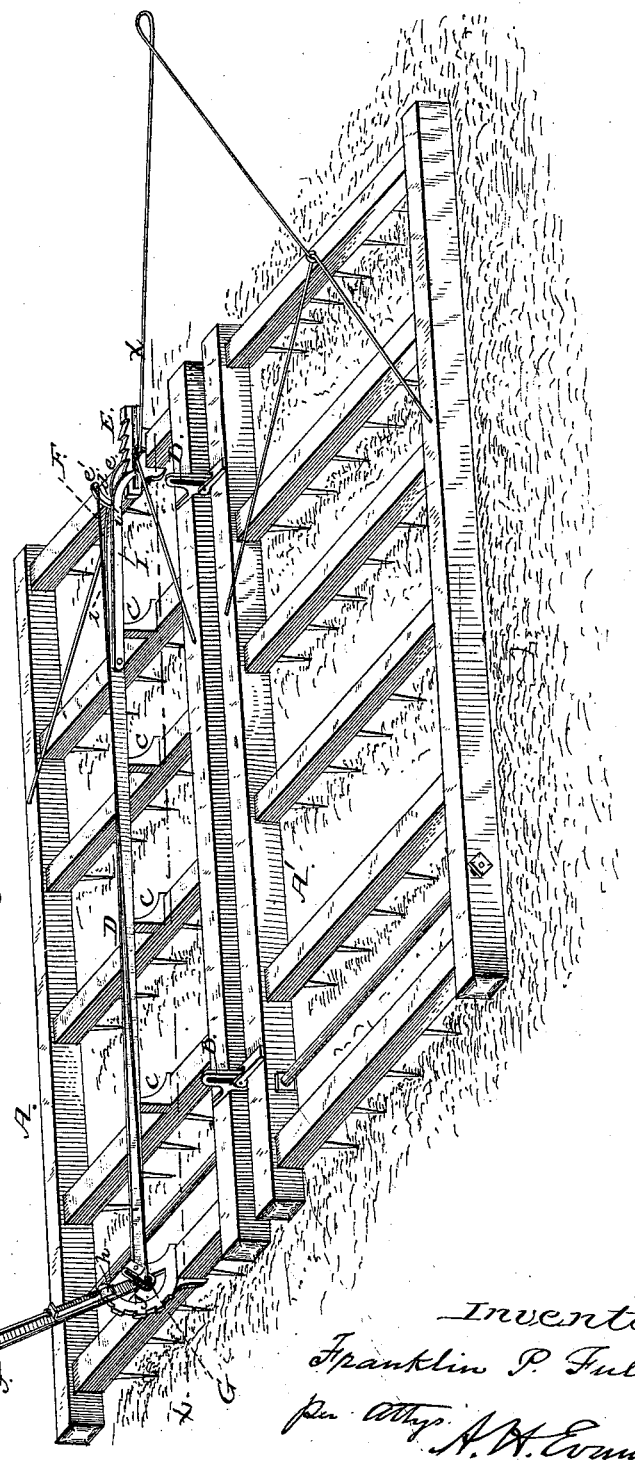
Figure 2:
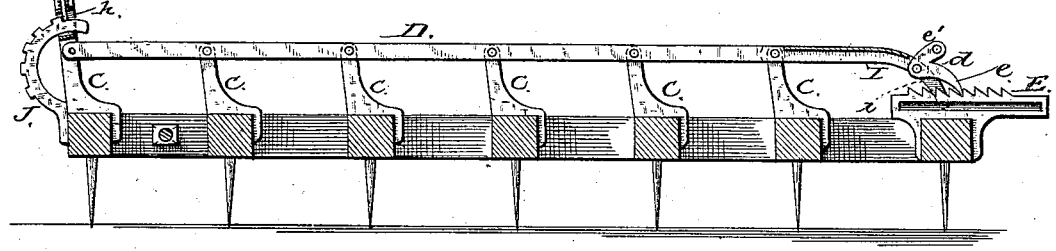
Figure 3:
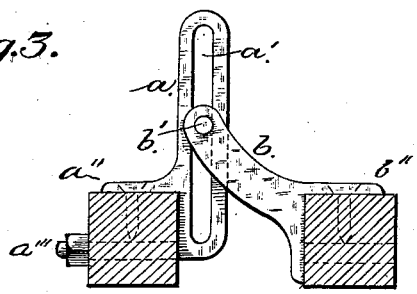
Figure 4:
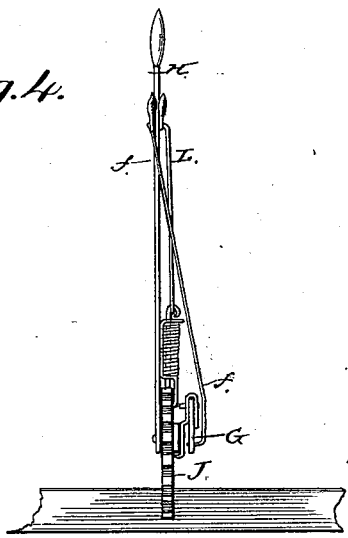

Figure 1 is a perspective view of a harrow with my improvements attached. Fig. 2 is a section through x x of Fig. 1. Fig. 3 is a detached view of the hinge. Fig. 4 shows details referred to.

My invention refers to that class of harrows which automatically adjust themselves to the irregularities of the ground; and it consists in the combination of devices hereinafter described and claimed.

To enable others skilled in the art to make and use my invention, I will proceed to describe the exact manner in which I have carried it out.

In the drawings, A A' represent the frames of two harrows connected by the hinges B B. These hinges are formed of the two parts $a$ and $b$, as shown in Fig. 3. The part $a$ is constructed with a vertical slot, $a'$, of about six inches, in which slides the bolt $b'$, secured between the ears of the part $b$. The parts $a$ $b$ are secured by the arms $a''$ and $b''$, by screws or other convenient means, and by the bolt $a'''$, to the frames A A', and by this construction of the hinge the harrows have a vertical play of six inches in addition to the ordinary swing of hinged harrows. By my construction of the hinge either section of the harrow has an independent rise or fall with respect to the other, to accommodate any unevenness of the ground, or, in passing over any obstruction, to allow one section, or either end of one section, to rise while the other section remains in a level position on the ground.

The cross-bars containing the teeth I make of tough white oak, and in the center of these I rigidly secure the knees C, through which the cross-bars are controlled and held. By this means more or less elasticity is secured in the bars, which tends to prevent the teeth from bending or breaking, as they frequently do in solid harrows, when meeting with an obstruction.

To the top of each knee is pivoted the longitudinal bar D, carrying on its forward end the pivoted bell-crank lever $d$, the lower or long arm, $e$, of which acts as a pawl on the toothed bar E, while the short or upper arm, $e'$, is connected by a rod, F, to the swinging lever G, attached to the rear end of the longitudinal bar D. This swinging lever is also connected by the rod $f$ to the bell-crank lever $g$, on the outer end of the main lever H. It is evident that by this arrangement of levers and connecting-rods the pawl $e$ can be raised or lowered at pleasure, thereby engaging with or releasing it from the tooth-bar E.

To hold the pawl $e$ squarely on the toothed bar E and secure its successful operation I place on the forward end of the longitudinal bar D the guard I, provided with two arms, $i$ $i$, which snugly inclose the toothed bar E on each side, and which hold the pawl $e$ to its proper position on the top of the toothed bar E. The front cross-bar, on which is secured the toothed bar E, is rigidly secured in the frame A, while all the other cross-bars are secured so as to partially revolve, for a purpose hereinafter described.

The knee on the rear cross-bar is constructed with the segmental rack-bar J, and has pivoted to its top the main lever H, with a loop, $h$, inclosing the segmental rack-bar. Through the upper portion of the loop passes the spring-bolt $k$, meshing with the segmental rack. This spring-bolt is operated by means of the rod L and small bell-crank lever $l$, on the outer end of the lever H.

The operation of this part of my invention is as follows: When the harrow, as shown in Fig. 1, is passing over the ground it is liable to become choked with weeds, grass, roots, &c. In such a case it is only necessary to press up the small crank-lever $g$, which, through the levers G and $d$ and their connecting-rods, will raise and release the pawl $e$, whereby the teeth of the harrow are allowed to turn back and out of the ground, and in moving its own length the harrow will be cleared of the trash which had accumulated on the teeth, thus avoiding the annoyance and labor involved in raising the harrow from the ground. The operator can then, by means of levers, again readjust the teeth with one hand to any desired angle or to a vertical position without stopping the team.

I am aware that the teeth of harrows have been made adjustable by means of levers and bars, and therefore I do not claim these broadly.

Having thus described my invention, what I claim as new, and desire to secure by Letters Patent, is—

In an adjustable harrow, the knees C, longitudinal bar D, provided on its forward end with the lever $d$ and pawl $e$, the guard I, provided with arms $i\ i$, the rods F and $f$, and levers $d$, G, and $g$, in combination with the segmental rack-bar J, main lever H, spring-bolt $k$, and toothed bar E, all constructed and arranged to operate substantially as and for the purpose described.

FRANKLIN PIERCE FULLER.

Attest:
 JOHN D. EWING,
 A. W. MARSH.